United States Patent [19]
Hara et al.

[11] Patent Number: 5,783,133
[45] Date of Patent: Jul. 21, 1998

[54] METHOD FOR MAKING A MULTILAYER MOLDED ARTICLE

[75] Inventors: Takahisa Hara, Kawanishi; Masahito Matsumoto, Ibaraki; Tadayuki Oda, Mie-gun; Hiromu Fujita, Ashiya; Yuji Kamiji, Yokkaichi; Hiromasa Nakatsuka, Mie-gun, all of Japan

[73] Assignees: Sumitomo Chemical Company, Limited, Osaka; Nissen Chemitec Corporation, Ehime-ken, both of Japan

[21] Appl. No.: 208,907

[22] Filed: Mar. 11, 1994

Related U.S. Application Data

[62] Division of Ser. No. 10,387, Jan. 28, 1993, abandoned.

[30] Foreign Application Priority Data

Jan. 28, 1992 [JP] Japan .................. 4-012966

[51] Int. Cl.⁶ .................. B29C 33/12; B29C 45/14
[52] U.S. Cl. .................. 264/261; 264/263; 264/266; 264/273; 264/274; 264/275
[58] Field of Search .................. 264/255, 259, 264/267, 274, 266, 254, 261, 250, 263, 273, 275, 318, 328.7

[56] References Cited

U.S. PATENT DOCUMENTS

| 5,053,179 | 10/1991 | Masui et al. | 264/278 |
| 5,283,028 | 2/1994 | Breezer et al. | 264/511 |
| 5,308,570 | 5/1994 | Hara et al. | 264/255 |
| 5,395,580 | 3/1995 | Morita et al. | 264/266 |

FOREIGN PATENT DOCUMENTS

| 343245 | 11/1989 | European Pat. Off. |
| 2394377 | 1/1979 | France . |
| 63-198673 | 8/1988 | Japan . |
| 2000074 | 1/1979 | United Kingdom . |

Primary Examiner—Angela Y. Ortiz
Attorney, Agent, or Firm—Birch, Stewart, Kolasch & Birch, LLP

[57] ABSTRACT

A multilayer molded article made of a first member having a first core layer and a first skin material laminated on the first core layer, and a second member having a second core layer and a second skin material layer laminated on the second core layer, in which the first member is insert laminated in a part of the surface of the second skin material, and which is beautifully finished at a boundary between the first and second skin materials.

21 Claims, 3 Drawing Sheets

METHOD FOR MAKING A MULTILAYER MOLDED ARTICLE

This application is a divisional of application Ser. No. 08/010,387 filed on Jan. 28, 1993, now abandoned.

BACKGROUND OF THE INVENTION

1. Field of the Invention

The present invention relates to a multilayer molded article comprising a molded article and at least two skin materials laminated thereon and a method for producing the same which finishes a boundary between the skin materials beautifully and produces a molded article suitable for an interior part of a vehicle.

2. Description of the Related Art

Hitherto, a multilayer molded article is produced by bonding two or more skin materials on a core layer of a resin with an adhesive. However, this method is troublesome and it is difficult to bond the skin materials beautifully in particular when the core layer has a curved surface. Further, a bond strength of the adhesive or its durability may cause some troubles, and it is difficult to beautifully finish the boundary of the skin materials.

As an alternative method, it is known to connect parts which are separately produced by thermoforming, injection molding or press molding and have a laminated skin material, with an adhesive or a bolt. This method is also troublesome, and the adhesive has insufficient bond strength and durability. In particular, with a polyolefin such as polypropylene, there is no good adhesive.

In the case of bolting, a head of the bolt appears on the surface of the molded article and impairs an appearance of the article. In addition, stress is concentrated at the bolted part, so that the molded article tends to be broken from this part. The finishing of the boundaries between the skin materials is limited.

SUMMARY OF THE INVENTION

One object of the present invention is to provide a multilayer molded article having at least two skin materials on the article in which a boundary or boundaries of the skin materials are beautifully finished.

Another object of the present invention is to provide a method for producing a multilayer molded article having at least two skin materials a boundary or boundaries of which are beautifully finished.

According to a first aspect of the present invention, there is provided a multilayer molded article comprising a first member which comprises a first core layer and a first skin material laminated on said first core layer, and a second member which comprises a second core layer and a second skin material layer laminated on said second core layer, wherein the first member is insert laminated in a part of the surface of the second skin material.

According to a second aspect of the present invention, there is provide a method for producing a multilayer molded article comprising steps of placing a first member which comprises a first core layer and a first skin material laminated on said first core layer on a mold surface with contacting the first skin material to a part of male or female mold, supplying a second skin material between the male and female molds, supplying a resin melt between the second skin material and the mold to which the first member is not contacted, pressing and cooling the molds so that the first member is insert laminated in a part of the surface of the second skin material of a second member comprising a second core layer and the second skin material.

DETAILED DESCRIPTION OF THE DRAWINGS

In the present invention, as the first and second skin layers, any of the conventionally used skin materials can be used. Examples of the skin material are woven or non-woven fabrics, nets of metal, fiber or thermoplastic resins, paper, metal foils, sheets made of a thermoplastic resin and a thermoplastic elastomer. The skin material may be decorated by, for example, embossing, printing or dyeing. Further, a foam sheet of a thermoplastic resin (e.g. polyolefin, polyvinyl chloride, etc.), a thermosetting resin (e.g. polyurethane, etc.) or a rubber (e.g. poly-cis-2,4-butadiene, ethylene-propylene copolymer, etc.) can be used as the skin material. Two or more skin materials may be used in a laminated form bonded with an adhesive.

At least a part of the skin material may be heated to adjust its tensile stress and/or elongation before it is supplied in the molds.

The thermoplastic resin to be used as the first and second core layer according to the present invention is not limited and any of those conventionally used in compression molding, injection molding and extrusion molding may be used. Examples of the thermoplastic resin are thermoplastic resins such as polypropylene, polyethylene, polystyrene, acrylonitrile-styrene-butadiene copolymer and polyamide; and thermoplastic elastomers such as ethylene-propylene block copolymer and styrene-butadiene block copolymer.

The thermoplastic resin containing an additive such as a filler (e.g. an inorganic filler or glass fibers), a pigment, a lubricant, an antistatic agent, and the like may be used.

Figure 1A:
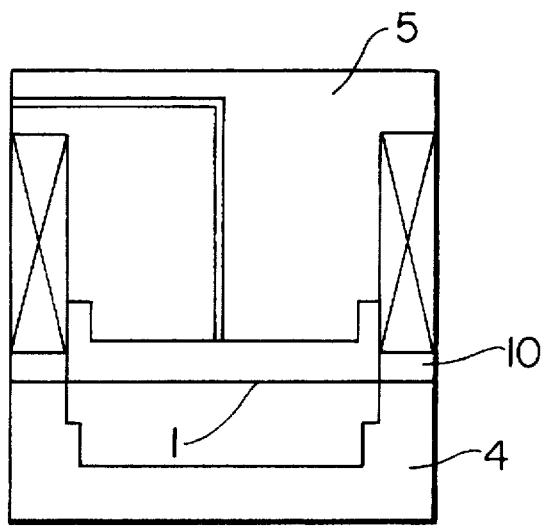
FIGS. 1A to 1C schematically show the cross sectional views of a pair of molds used in press molding a first member in various steps, FIGS. 2A to 2C schematically show the cross sectional views of a pair of molds used in press molding a second member and simultaneously insert laminating the first member in the second member.
Figure 1B:
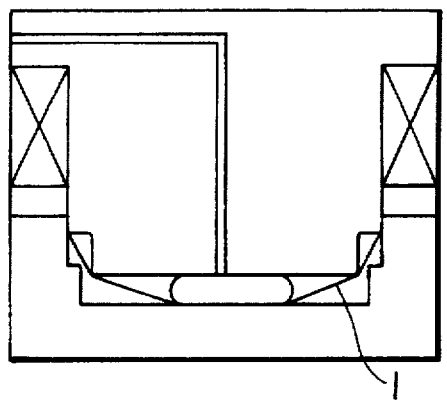
Figure 1C:
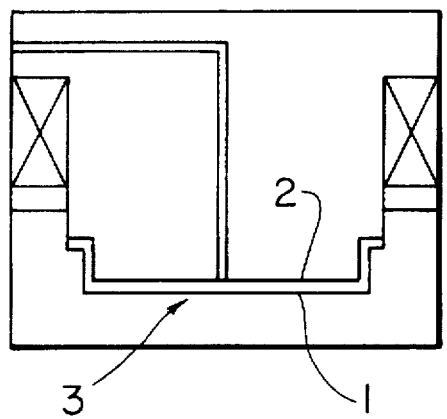

FIGS. 1A to 1C schematically show the cross sectional views of a pair of molds used in press molding a first member in various steps.

In the step shown in FIG. 1A, a first skin material 1 is supplied between a female mold 4 and a male mold 5 and the female mold 4 is lifted up to clamp the skin material 1 between a skin material-holding frame 10 and the female mold 4. In the step shown in FIG. 1B, a melt of a resin is supplied while the molds are being closed. The resin melt flows till ends of a cavity formed by inner surfaces of the male and female molds while it presses the first skin material to the female mold surface. In FIG. 1C, the molds are closed to the final position and cooled to shape the first member 3.

Figure 2A:
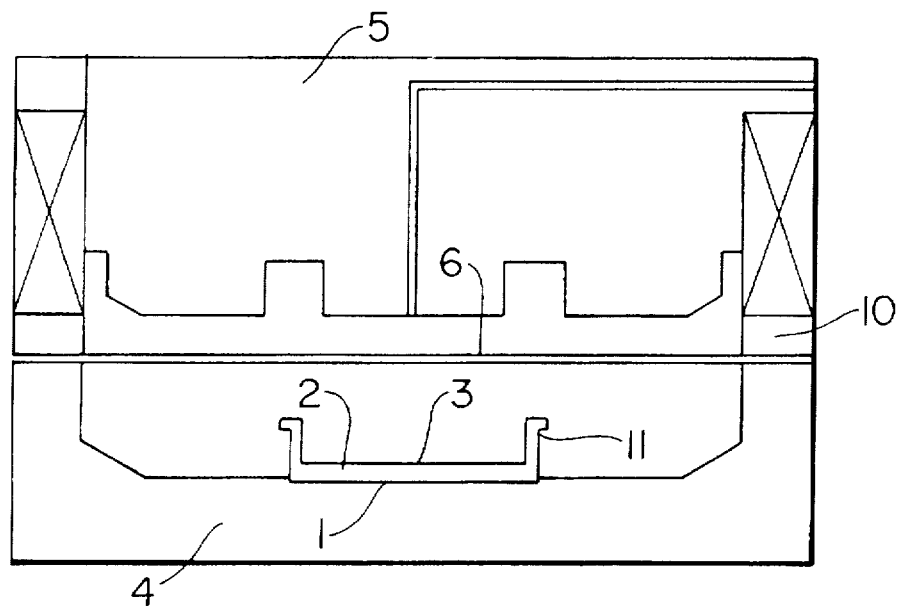
Figure 2B:
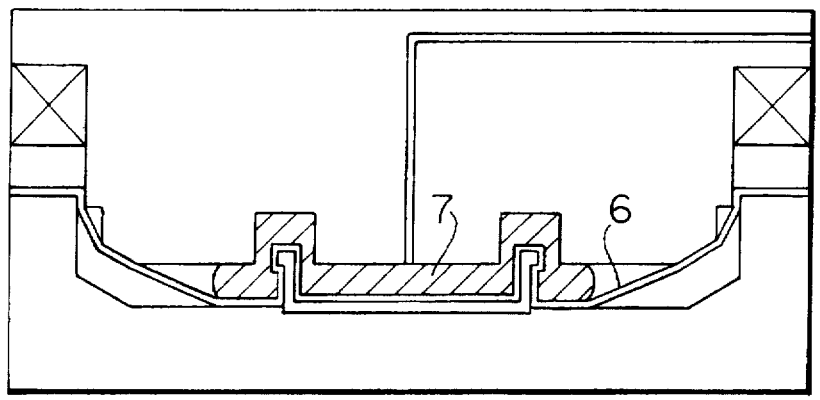
Figure 2C:
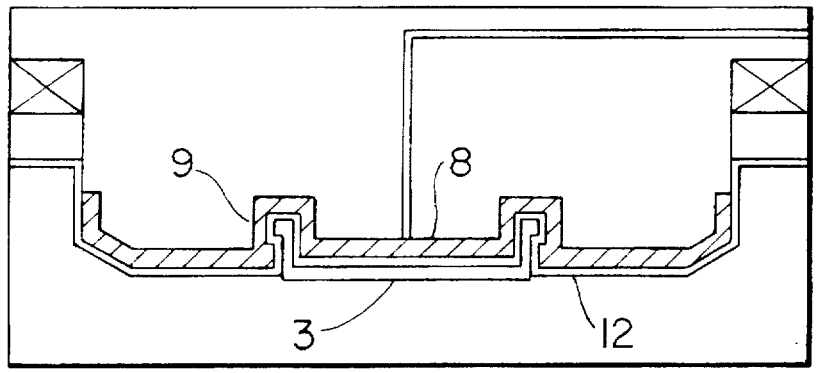

FIGS. 2A to 2C schematically show the cross sectional views of a pair of molds used in press molding a second member and simultaneously insert laminating the first member in the second member.

In the step shown in FIG. 2A, the first member 3 is placed on a depressed portion of a female mold 4, and a second skin material 6 is clamped between the skin material-holding frame 10 and the female mold 4. In the step shown in FIG.

2B, a resin melt 7 is supplied while the molds are being closed. In FIG. 2C, the mold closing is completed and the molds are cooled. Since, in the above steps, the first member 3 is already cooled and the resin melt for the second member 9 is filled and then cooled around the standing edge of the first member 3, the first member 1 is insert laminated in the second member 9 by the shrinkage of the formed core layer 8 of the second member 9.

In this embodiment, at least an undercut 11 is provided at the edge of the first member 3 so as to secure the insert lamination of the first member 3 in the second member 9. The second core layer 8 surrounds the undercut 11 through the second skin material 6, whereby the first member 3 and the second member 9 are firmly insert laminated. In the multilayer molded article of this embodiment, the first member 1 is insert laminated with a slight protrusion above the plane of the second member 9 having the laminated second skin material 6, and the first skin material 1 and the second skin material 6 are parted by an upstand 12, whereby the molded article has a good appearance. Different from the members which are connected by the bolts after molding, since the resin of the second member 9 is press molded around the first member 3, a boundary plane between the first and second skin materials 6, 8 is neatly formed, and the appearance of the molded article is excellent.

When a height of the upstand 12 is too high in the above insert lamination process, it is fallen down by the flow of the resin melt for the second core layer. Preferably, the height of the upstand 12 is from about 3 to 8 mm.

The resins for the first and second core layers 2, 8 may be the same or different.

The surface of the first member 3 protrudes slightly above the surface level of the second member 9. This is because the first member 3 is placed in the depressed part of the female mold, whereby the first member 3 is easily positioned and is not moved by the flow of the resin melt 7 during molding. When a part of the mold surface on which the first member 3 is placed at the same level as or a higher level than other part of the mold surface, a telescopic member is provided at the part of the mold surface on which the first member 3 is placed, and the first member 3 is vacuum sacked through a narrow gap between the mold body and the telescopic member to fix the first member 3, whereby the multilayer molded article of the present invention is easily produced.

The excessive part(s) of the skin material(s) may be trimmed as proposed in Japanese Patent Kokai Publication No. 135716/1986 corresponding to EP-A-0 186 015.

The molds of FIGS. 1 and 2 may be attached to respective pairs of platens of one press machine, and the first member 3 is molded with trimming the skin material by one pair of the molds and transferred to the other pair of the molds. Then, the second member 9 is press molded with insert laminating the first member and simultaneously another first member 3 is molded.

Figure 3:
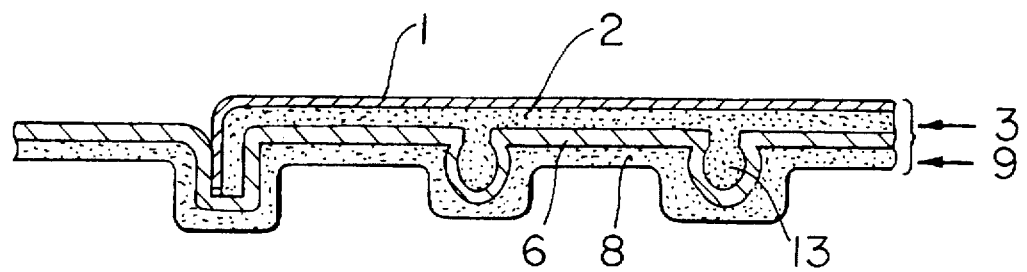
FIGS. 3 to 6 are cross sectional views of the multilayer molded articles of the present invention in various embodiments.
Figure 4:
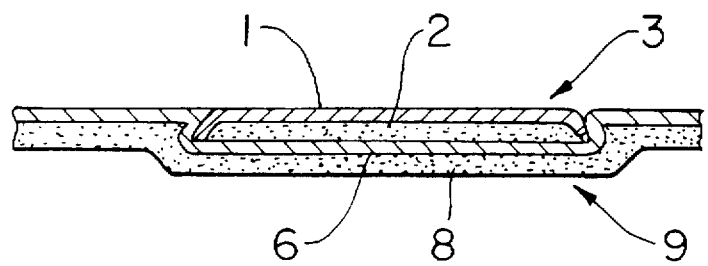

To firmly insert laminating the first member 3 with the second member 9, the undercut 11 is provided at a part or all of the periphery of the first member 3. Alternatively or additionally, protrusions 13 as shown in FIG. 3 or depressions can be provided on the back face of the first core layer 2 of the first member 3. Further, the first and second members may be formed as shown in FIG. 4.

Figure 5:
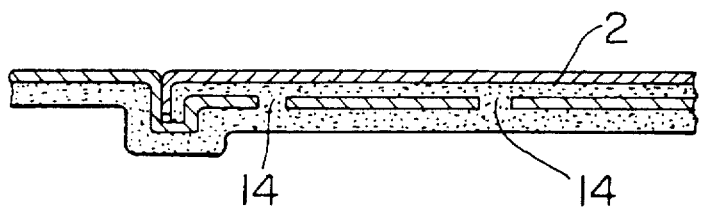

The first and second members may be firmly bonded by welding. When the first and second core layers are made of the same resin having good weldability, holes 14 are made in the first skin material 6 of the first member 3 as shown in FIG. 5, whereby, through the holes 14, the resin melt 7 and the resin of the core layer 2 of the first member 3 are welded.

Figure 6:
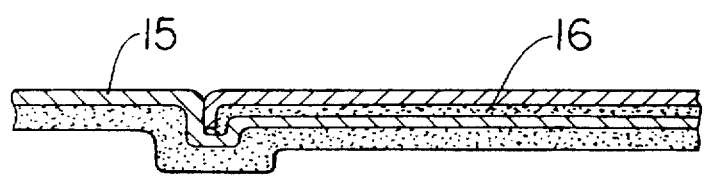

When the resin of the first core layer 2 of the first member 3 and the second skin material 6 of the second member 9 are easily welded, as shown in FIG. 6, a part 15 of the second skin material 6 contacted to the mold is not molten on its surface since heat is deprived by the mold, while other part 16 of the skin material 6 contacted to the first member 3 is molten since the heat insulating effect of the first member 3 is large, so that the first core layer 2, the second skin material 6 and the second core layer 8 are welded.

While, in the above explanation, two members are used, it is possible to use three or more members each comprising a core layer and a skin material laminated thereon.

While the press molding is explained in the above, it is possible to apply the above method in the injection molding. The press molding can provide a multilayer molded article having a better appearance than the injection molding, since the molding pressure in the injection molding is several times higher than the press molding.

To maintain good feeling of the skin material, timings of the supply of the resin melt 7 and the mold closing are important. The resin melt 7 is supplied through a resin passage formed in one of the mold when a clearance between the male and female molds is from (c+5) to (c+100) mm wherein "c" is a clearance of the molds at the end of the molding, at a mold closing rate of 35 mm/sec. or smaller.

PREFERRED EMBODIMENTS OF THE INVENTION

The present invention will be illustrated by the following Examples.

Example 1

As a first skin material, a polyester woven fabric was used, and as a second skin material, a laminate sheet of a polyvinyl chloride sheet having a thickness of 0.4 mm and a polypropylene foam sheet having a thickness of 3.0 mm and an expansion ratio of 15 times which were bonded with an adhesive was used.

Using the molds similar to those shown in FIG. 1, the female mold was lifted up at a rate of 20 mm/sec. When the clearance between the male and female molds reached 50 mm, a melt of polypropylene containing 10% by weight of inorganic fillers heated at 230° C. was supplied between the first skin material and the male mold. Simultaneously the molds were pressed under a molding pressure of 80 kg/cm$^2$ to shape the resin melt and obtain a first member 1.

The formed first member 1 was transferred on the determined position of the female mold provided in the same press molding machine and fixed. Then, the second skin material was placed between the male and female molds and clamped between the female mold and a skin material-holding frame attached to the male mold. By the same steps as in the production of the first member, the melt of the same resin was supplied between the second skin material and the male mold and press molded under a molding pressure of 80 kg/cm$^2$, followed by cooling to shape the resin melt for the second member and obtain a multilayer molded article in which the first member having the laminated first skin material was insert laminated with the second member having the laminated second skin material.

On the produced multilayer molded article, the skin materials had no breakage or wrinkle and the boundary between the two skin materials was beautifully finished.

Example 2

As a first skin material, a laminate sheet of a polyester tricott fabric and an olefin elastomer sheet having a thickness of 0.2 mm was used, and as a second skin material, an extruded sheet of olefinic thermoplastic elastomer having a thickness of 0.6 mm was used.

Using the molds similar to those shown in FIG. 1, the female mold was lifted up at a rate of 30 mm/sec. When the clearance between the male and female molds reached 50 mm, a melt of polypropylene containing 15% by weight of inorganic fillers heated at 230° C. was supplied between the first skin material and the male mold. Simultaneously the molds were pressed under a molding pressure of 80 kg/cm$^2$ to shape the resin melt and obtain a first member 1.

The formed first member 1 was transferred on the determined position of the female mold provided in the same press molding machine and fixed. Then, the second skin material was placed between the male and female molds and clamped between the female mold and a skin material-holding frame attached to the male mold. By the same steps as in the production of the first member, the melt of the same resin was supplied between the second skin material and the male mold and press molded under a molding pressure of 80 kg/cm$^2$, followed by cooling to shape the resin melt for the second member and obtain a multilayer molded article in which the first member having the laminated first skin material was insert laminated with the second member having the laminated second skin material.

On the produced multilayer molded article, the skin materials had no breakage or wrinkle and the boundary between the two skin materials was beautifully finished.

What is claimed is:

1. A process for producing a multilayer molded article, which comprises:

placing a first member, which is comprised of a first core layer and a first skin material laminated on said first core layer and has at least one protrusion or at least one depression on a back face thereof on which the first skin material is not laminated, between a male and a female mold, wherein said first skin material is in contact with a mold surface of either the male or female mold;

disposing a second skin material between said first member and the mold to which the first skin material is not in contact with;

supplying a resin melt between said second skin material and said mold to which the first skin material is not in contact with; and pressing together and cooling the male and female molds to thereby mold said resin melt into a second core layer having the second skin material laminated thereon and said first member insert laminated therein over a part of the surface of the second skin material, wherein said first member has at least one undercut.

2. A process for producing a multilayer molded article, which comprises:

placing a first member, which is comprised of a first core layer and a first skin material laminated on said first core layer, between a male and a female mold, wherein said first skin material is in contact with a mold surface of either the male or female mold;

disposing a second skin material having at least one hole therein between said first member and the mold to which the first skin material is not in contact with;

supplying a resin melt between said second skin material and said mold to which the first skin material is not in contact with; and pressing together and cooling the male and female molds to thereby mold said resin melt into a second core layer having the second skin material laminated thereon and said first member insert laminated therein over a part of the surface of the second skin material and such that said first core layer and said second core layer are welded together through said hole in said second skin material.

3. The process according to claim 2, wherein said first member is placed into a depression of the female mold.

4. The process according to claim 2, wherein said first and second core layers are made of the same resin.

5. The process according to claim 2, wherein said first core layer comprises a thermoplastic resin and said second core layer comprises a thermoplastic resin.

6. The process according to claim 2, wherein said first core layer comprises a polymer selected from the group consisting of polypropylene, polyethylene, polystyrene, acrylonitrile-styrene-butadiene copolymer, polyamide, ethylene-propylene block copolymer, and styrene-butadiene block copolymer.

7. The process according to claim 2, wherein said second core layer comprises a polymer selected from the group consisting of polypropylene, polyethylene, polystyrene, acrylonitrile-styrene-butadiene copolymer, polyamide, ethylene-propylene block copolymer, and styrene-butadiene block copolymer.

8. The process according to claim 2, wherein said first and second skin materials are each independently selected from the group consisting of woven fabrics, non-woven fabrics, metal nets, fiber nets, thermoplastic resin nets, metal foils, thermoplastic resin sheets, thermoplastic elastomer sheets, and paper.

9. The process according to claim 2, wherein said pressing together of said male and female molds is carried out by closing the molds at a rate in the range of from greater than zero to 35 mm/second, until the desired clearance between the male and female molds is reached.

10. The process according to claim 2, wherein said supplying of said resin melt occurs when a clearance between said male and female molds is within the range of (c+5 mm), to (c+100 mm), wherein c is a clearance between the said male and female molds at the completion of molding.

11. The process according to claim 10, wherein said male and female molds are being closed when said resin melt is supplied at a rate of from greater than zero to 35 mm/second.

12. A process for producing a multilayer molded article, which comprises:

providing a first member which is comprised of a first core layer and a first skin material laminated on a front face of said first core layer, a back face of said first core layer including at least one protrusion thereon, said protrusion increasing in width proceeding outwardly from said back face;

placing said first member between a male and a female mold, wherein said first skin material is in contact with a mold surface of either the male or female mold;

disposing a second skin material between said first member and the mold to which the first skin material is not in contact with;

supplying a resin melt between said second skin material and said mold to which the first skin material is not in contact with; and pressing together and cooling the male and female molds to thereby mold said resin melt into a second core layer having the second skin material laminated thereon and said first member insert laminated therein over a part of the surface of the second skin material, whereby said protrusion interconnects said first member to said second core layer having the second skin material laminated thereon.

13. The process according to claim 12, wherein said first member is placed into a depression of the female mold.

14. The process according to claim 12, wherein said first and second core layers are made of the same resin.

15. The process according to claim 12, wherein said first core layer comprises a thermoplastic resin and said second core layer comprises a thermoplastic resin.

16. The process according to claim 12, wherein said first core layer comprises a polymer selected from the group consisting of polypropylene, polyethylene, polystyrene, acrylonitrile-styrene-butadiene copolymer, polyamide, ethylene-propylene block copolymer, and styrene-butadiene block copolymer.

17. The process according to claim 12, wherein said second core layer comprises a polymer selected from the group consisting of polypropylene, polyethylene, polystyrene, acrylonitrile-styrene-butadiene copolymer, polyamide, ethylene-propylene block copolymer, and styrene-butadiene block copolymer.

18. The process according to claim 12, wherein said first and second skin materials are each independently selected from the group consisting of woven fabrics, non-woven fabrics, metal nets, fiber nets, thermoplastic resin nets, metal foils, thermoplastic resin sheets, thermoplastic elastomer sheets, and paper.

19. The process according to claim 12, wherein said pressing together of said male and female molds is carried out by closing the molds at a rate in the range of from greater than zero to 35 mm/second, until the desired clearance between the male and female molds is reached.

20. The process according to claim 12, wherein said supplying of said resin melt occurs when a clearance between said male and female molds is within the range of (c+5 mm), to (c+100 mm), wherein c is a clearance between the said male and female molds at the completion of molding.

21. The process according to claim 20, wherein said male and female molds are being closed when said resin melt is supplied at a rate of from greater than zero to 35 mm/second.

* * * * *